United States Patent [19]

Sanada et al.

[11] 4,133,193

[45] Jan. 9, 1979

[54] THROTTLE GRIP LOCKING DEVICE FOR MOTORCYCLES

[75] Inventors: Rentaro Sanada, Asaka; Shigeo Kawada, Tokyo, both of Japan

[73] Assignee: Honda Giken Kogyo Kabushiki Kaisha, Tokyo, Japan

[21] Appl. No.: 861,409

[22] Filed: Dec. 16, 1977

[30] Foreign Application Priority Data

Dec. 20, 1976 [JP] Japan .............................. 51-170695[U]

[51] Int. Cl.² ...................... B60R 25/04; E05B 65/12; F16K 35/10; G05G 5/00
[52] U.S. Cl. ........................................ 70/183; 70/210; 70/242; 180/114

[58] Field of Search ................ 70/183, 184, 185, 186, 70/182, 207, 210–211, 233, 237, 242, 252; 123/198 B, 198 DB; 180/114; 280/289 L, 289 H; 74/485, 488, 531

[56] References Cited

U.S. PATENT DOCUMENTS

| 2,135,759 | 11/1938 | Mabee | 70/252 |
| 2,776,579 | 1/1957 | Nichel | 74/488 |
| 3,982,446 | 9/1976 | Van Dyken | 74/488 |
| 4,056,089 | 11/1977 | Ratliff | 123/198 B |

*Primary Examiner*—Robert L. Wolfe
*Attorney, Agent, or Firm*—Irving M. Weiner; Pamela S. Austin; Melvin Yedlin

[57] ABSTRACT

A throttle grip locking device for a motorcycle. A rotary throttle grip has a locking member disengagably engaged with an engaging member to prevent rotation of said throttle grip when the motorcycle engine is not operating.

7 Claims, 8 Drawing Figures

THROTTLE GRIP LOCKING DEVICE FOR MOTORCYCLES

The present invention relates to a throttle grip locking device provided on a handle controlling an air-fuel mixture to be fed to an engine of a motorcycle.

More particularly, the invention relates to a throttle grip locking device of a motorcycle of a type having at one end of a handle a rotary throttle grip to control the operation of the engine wherein, when the engine is stopped, the throttle grip will be locked so as to be non-rotatable, to be prevented from operating while the motorcycle is parked, to improve the startability of the engine, and to help prevent the motorcycle from being stolen.

BACKGROUND OF THE INVENTION

The engine controlling system of a motorcycle is exposed. Therefore, a motorcycle is provided with a handle locking device or the like to prevent theft. No other particular consideration is made on the operating system.

That is to say, conventionally no consideration other than a main switch including an ignition circuit is made on the operating system of the engine. Therefore, while the motorcycle is parked, the throttle grip of the handle can be freely rotated and operated, and is often purposely mischievously rotated and operated by strangers.

Such rotating operation of the throttle grip during the parking or the like causes the following problems.

When the throttle grip is rotated and operated while the engine is not being operated, the fuel will be led into the suction passage to the engine, particularly by a mechanical accelerating pump or the like so that a too rich mixture will be fed at the time of starting the engine. Not only will it be difficult to start the engine, but also the battery will likely be exhausted by the repeated starting operation of the starting self-starter.

Thus, the rotation operation of the throttle grip when the engine is not running will have an undesirable influence on the starting of the engine or the like.

SUMMARY OF THE INVENTION

The invention provides a throttle grip locking device for a motorcycle which includes a rotary throttle grip for controlling the operation of the engine of the motorcycle. The rotary throttle grip has stationary portions and movable portions, and a locking member and an engaging part is mounted in one of the stationary portions of the throttle grip. The locking member is disengagably engaged with the engaging part to prevent rotation of the rotary throttle grip.

An object of the invention is to provide a throttle grip locking device for motorcycles wherein rotation of the throttle grip is made impossible when the motorcycle is parked with the engine not running. Mischievous throttle operation is thus prevented, and fuel is prevented from becoming too rich at the time of starting the engine. Startability of the engine can be secured under any conditions, and the engine can be started at an optimum mixture ratio by the grip operation which is permitted after starting.

Another object is to provide a throttle grip locking device in a motorcycle controlling the operation of the engine with the rotating operation of a rotary throttle grip wherein, when the engine stops, the throttle grip will be locked as operatively connected with the stopping operation so as to be unable to be rotated and operated.

A further object is to obtain a throttle grip locking device wherein, during parking, the throttle grip will be locked. Therefore, even if the current source is directly connected, the engine will not be able to be operated, and the motorcycle will be prevented from being stolen.

According to the invention, as operatively connected with the operation of switching off the ignition key, an engaging member is driven by the rotating operation of the key and the key operation of a solenoid so that the throttle grip is engaged with the engaging member so as to be prevented by the engaging member from being rotated. By the operation of switching on the key, the throttle grip is mechanically or electrically disengaged from the engaging member so as to be able to be freely rotated and operated.

A secondary object is to provide a throttle grip locking device, wherein, as the locking of the throttle grip and the operation of the key are operatively connected with each other, the locking and unlocking operations are never forgotten. Also, the locking is easy and positive, and the throttle grip can be automatically locked by the operation of inserting and pulling out the key and of switching it on and off.

Another object is to obtain a throttle grip locking device wherein, as the rotating operation of the key and the locking of the throttle grip are operatively connected with each other, the mechanical and electrical structure is simple. The installation can be attained without greatly modifying the motorcycle or attaching a complicated device to it. Also, the operation is positive and the price is low.

DETAILED DESCRIPTION

Figure 1:
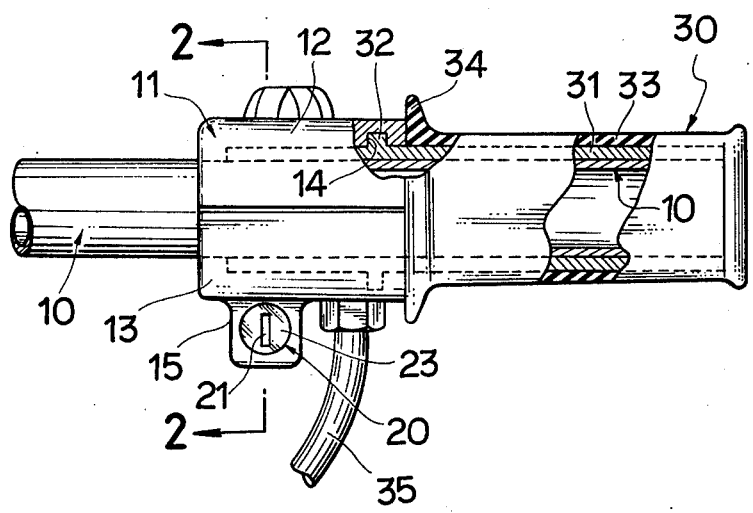
FIG. 1 is a partly-sectioned view of a throttle grip according to a first embodiment.

FIG. 1 shows a throttle side end part of a handle of a motorcycle. A handle pipe 10 is provided with a throttle grip 30 in its right end part. Grip 30 consists of a handle grip pipe 31 rotatably fitted to the right end part of pipe 10, and a grip rubber 33 formed of rubber or plastic secured to the outer periphery of pipe 31. Grip 30 is made integral with both pipe 31 and rubber 33.

The front part of pipe 31 is extended forward of a stopper flange 34 at the front end of grip rubber 33. A locking flange 32 is provided to project to be ring-shaped on the outer periphery of the extension forward of flange 34. Upper and lower cases 12 and 13 forming a throttle housing 11 are fitted forward of flange 34 to hold handle pipe 10. The extension of grip pipe 31 is fitted to the outer periphery of pipe 10 while being rotatably freely fitted within housing 11. A ring-shaped concave groove 14 is provided in the inside diameter part of cases 12 and 13. Locking flange 32 of pipe 31 is engaged with groove 14 to prevent the pipe 31 including grip rubber 33 from being pulled out toward the end of handle pipe 10. A part of pipe 31 is connected to one end of an inner cable (not illustrated) of a throttle cable 35, and such inner cable is connected at its other end to a throttle valve of a carburetor (not illustrated). The throttle grip pipe 31 is resiliently pressed together with the inner cable in the returning direction by a return spring (not illustrated), usually, the return spring of the carburetor.

A projecting part 15 is provided to project downwardly, integrally with or separately from a part of lower case 13, or is provided integrally with case 13 in the illustrated embodiment. A chamber 16 (FIG. 2) having an opening 18 in the inside diameter part of lower case 13 is provided as directed upwardly within projecting part 15. Chamber 16 is closed in its bottom, and is set to be smaller in its opening 18 than in other parts. A shoulder 17 is formed between chamber 16 and opening 18. A circular hole 19 is made in the lower part of chamber 16 to make chamber 16 communicate with the outside of projecting part 15.

A rotary switch member 20, to make the ignition operation and switch the current source on and off, is rotatably fitted in hole 19. Switch member 20 is projected on the end surface out of the rear surface of projecting part 15 as shown in FIG. 1, and is provided with a key slot 21 into which an ignition key 25 is to be extractably inserted. Member 20 consists of a combination switch 22 and a stopper 23 which is an extraction preventing member, is rotatable within hole 19, and is regulated in the axial direction.

Figure 3:
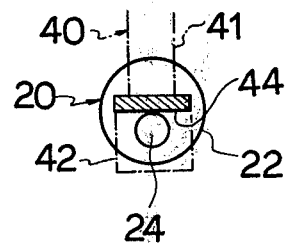
FIG. 3 is an end view of a rotary member.

A locking member 40 is slidably fitted in chamber 16. Member 40 is provided with a locking part 41 having a diameter fitting opening 18, a large diameter part 42 provided in its lower portion, and a cut part 43 provided on the rotary member 20 side. Member 40 is always resiliently pressed downwardly by a spring 45 compressed and fitted between part 42 and shoulder 17 forming the upper end of chamber 16. Cut part 43 is opposed to the end surface directed to the chamber 16 side of member 22. An engaging projection 24 engaging with cut part 43 is provided in an eccentric position on such end surface of member 22. This orientation is shown in FIG. 3. As shown in the drawing, the projection 24 is in contact with a shoulder 44 at the upper end of cut part 43.

An engaging groove 36 (FIG. 2) is provided in the outer peripheral position of the throttle grip pipe 31 opposed to opening 18. Groove 36 is in the returning position of the throttle grip pipe 31, i.e., in the starting position of the throttling operation of grip 30.

Figure 2:
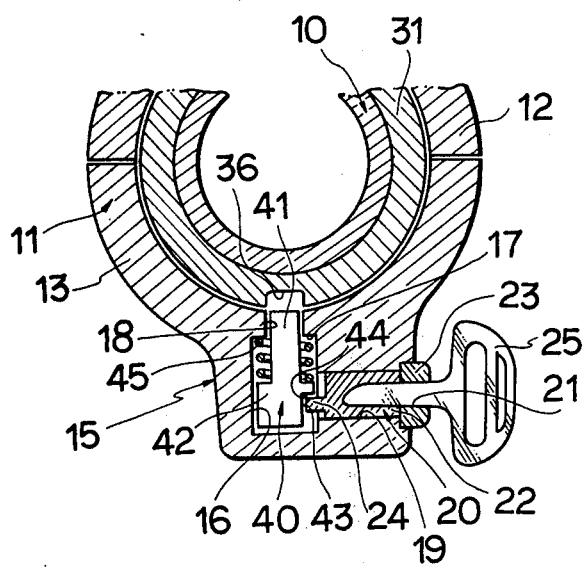
FIG. 2 is a sectioned view along line 2—2 of FIG. 1.

FIGS. 2 and 3 show the operating state of the engine. In the operating state, key 25 is inserted and engaged in slot 21, and is rotated so that the main switch is on and the operating state of the engine is continued. In this rotated position of member 20, the projection 24 is in the lower position as shown in FIG. 2, the locking member 40 is pushed down by the resiliency of spring 45, and the locking part 41 is sunk into opening 18 and does not project out of lower case 13. Therefore, the throttle grip pipe 31 freely rotates with the rotating operation of grip 33, and the control of the throttle valve is free so that the operating state of the engine can be controlled.

When key 25 is rotated to be off to stop the engine, the rotary member 20 engaged with it will also rotate, the current source circuit will be opened by switch 22, and operation of the engine will stop.

Figure 4:
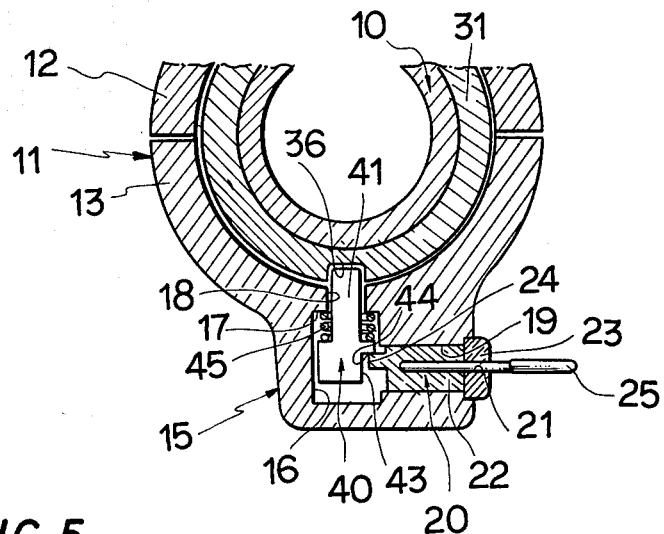
FIG. 4 shows the throttle grip as locked.
Figure 5:
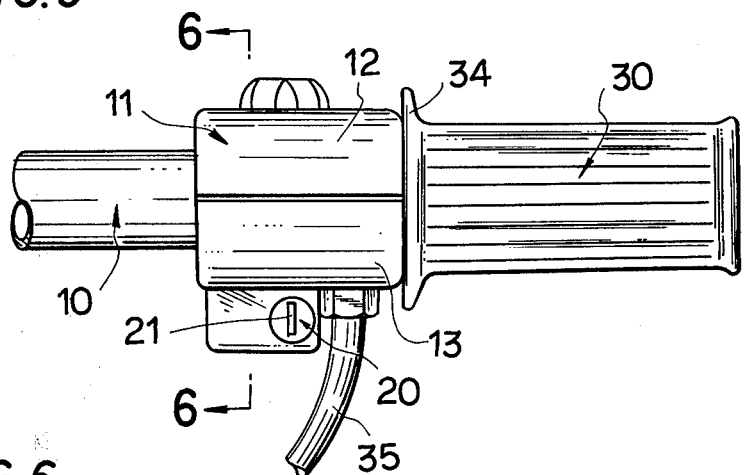
FIG. 5 shows a second embodiment.

The rotary member 20 will also rotate and will rise as the engaging projection 24 at the tip is eccentrically provided, and the locking member 40 engaged on shoulder 44 with projection 24 will rise against spring 45. As a result, the locking part 41 will project upwardly out of opening 18, and will enter groove 36 of the throttle grip pipe 31 having returned to the starting position. Pipe 31 will engage with locking member 40 which is the fixed side of the handle pipe 10 and will not be able to rotate and operate when the key is off, i.e., the throttle grip 30 will not be able to rotate and operate. This condition is shown in FIG. 4.

When key 25 is pulled out of slot 21, the condition will also be the same. Therefore, when the motorcycle is parked with the engine stopped, even if the throttling operation is made, the grip 30 will never rotate.

At the time of starting the engine, when key 25 is inserted into slot 21 and member 20 is rotated, the engaging projection 24 will lower, the locking member 40 will be lowered by the spring 45, and the locking part 41 will come out of groove 36 and will sink into opening 18. The locking will thus be released, and the throttle grip 30 will become free to rotate and operate.

Thus, as operatively connected with the operations of switching on and off the key, the throttle grip can be mechanically and automatically locked and unlocked without requiring a separate operation.

FIGS. 5 to 8 show a second embodiment of the present invention. In the drawings, the same numerals are used for the same respective parts as in the first embodiment.

Figure 6:
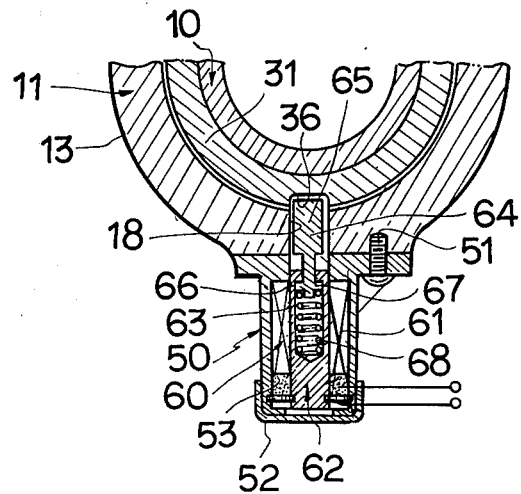
FIG. 6 is a sectioned view along line 6—6 of FIG. 5.

As shown in FIG. 6, a groove 36 is formed on the outer periphery of handle grip pipe 31. A casing 50 is provided to project downwardly in the lower part of the lower case 13 of the throttle housing 11 secured to handle pipe 10 and rotatably supporting pipe 31. Casing 50 is also a casing of the rotary member 20 having the key slot 21 and a casing of a solenoid. Casing 50 is formed separately from lower case 13, and is fixed with screws 51 properly to the lower surface of case 13.

A coil 61 and an iron core 62 are fitted within casing 50. Core 62 is of a type split into upper and lower members 64 and 63 as illustrated. Upper member 64 which is a locking member is fitted in lower member 63 to be free to move up and down. The rising limit of member 64 is regulated by shoulders 66 and 67 of members 63 and 64, respectively, so that member 64 can slide up and down with respect to member 63. The upper part of member 64 forms a locking part 65 which is positioned to be free to come out of and into opening 18 provided in case 13. A spring 68 is compressed and fitted between the inner bottom of member 63 and the shoulder 67 of member 64 so that member 64 is always resiliently pressed upwardly. Member 64 of this locking member is formed of a magnetic material.

The bottom of casing 50 is covered with a cover 52. The space between the bottom of casing 50 and the bottom of coil 60 is filled with a bonding agent 52. Coil 60 is connected with the ignition operating circuit through a lead wire.

FIG. 6 shows the stopped state of the engine. The current source is opened by the position of switching off the key, and the solenoid 60 is not operated. Therefore, the locking member 64 is pushed up by the resiliency of spring 68. Locking part 65 is engaged with groove 36 of pipe 31 having returned to the starting position so that the rotation of grip 30 is prevented, i.e., the throttle cannot be operated.

By the operation of switching on the key or the ignition operation, the coil 61 is electrically energized and the locking member 64 is attracted and lowered against the urge of spring 68 by magnetic force. Locking part 65 is thus lowered to disengage from groove 36. As a result, the throttle grip 30 is unlocked to be free to rotate and operate. In the operation state, the throttle operation is free to be made.

Thus, by the operation of the key to start the engine, the solenoid is electrically energized, and the locked throttle grip is unlocked. Further, by the operation of switching off the key, the throttle grip is automatically locked.

Figure 7:
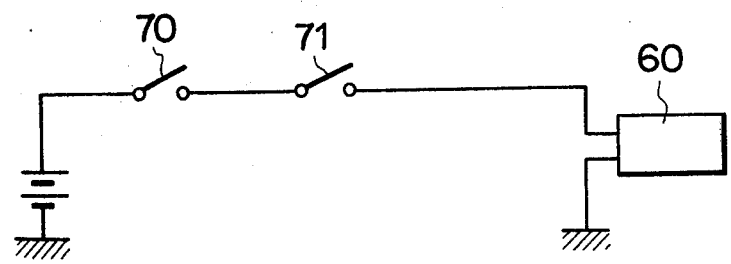
FIGS. 7 and 8 are diagrams showing examples of solenoid operating circuits.
Figure 8:
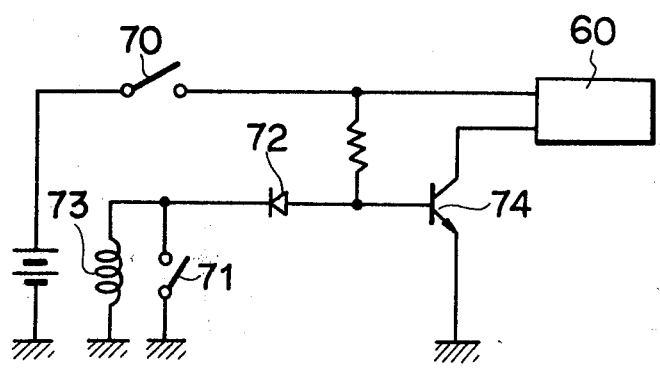

FIGS. 7 and 8 shows examples of circuits for operating the solenoid 60 with the operation of the key.

FIG. 7 shows an embodiment in which the solenoid 60 is provided in a direct current ignition circuit. When a main switch 70 and an ignition kill switch 71 are closed, the circuit of solenoid 60 will be closed. Locking member 64 will thus lower and the throttle grip pipe 31 will be unlocked.

FIG. 8 shows an embodiment in which solenoid 60 is provided in an alternating current ignition circuit. 72 is a diode, 73 is an ignition coil, and 74 is a transistor.

When main switch 70 is closed and the ignition kill switch 71 is opened, the transistor 74 will operate and an electric current will be passed through solenoid 60 which is a load of transistor 74. Therefore, the locking member 64 will lower and the throttle grip pipe 31 will be unlocked.

When switches 70 and 71 are closed, the transistor 74 will not operate and therefore the throttle grip pipe 31 will be locked.

The present invention has been explained in detail hereinabove. However, the mechanisms and electric circuits are not limited to the illustrated embodiments, but can be properly modified in design.

I claim:

1. A throttle grip locking device for a motorcycle, comprising:
    a rotary throttle grip for controlling the operation of the engine of said motorcycle;
    said rotary throttle grip having stationary portions and movable portions;
    a locking member and an engaging part mounted in one of said stationary portions of said throttle grip;
    said locking member being disengagably engaged with said engaging part to prevent rotation of said rotary throttle grip; and
    as operatively connected with the stopping of said engine by switching off a key, said locking member of the handle side is operated to prevent the rotation of said throttle grip.

2. A throttle grip locking device according to claim 1, wherein:
    said rotatable throttle grip (30) is provided with said engaging part (24) and said locking member (40) on the stationary side related with said engaging part; and
    said locking member (40) is disengagably engaged with said engaging part (24) of said throttle grip (30) located in the position when said engine stops so as to prevent the rotation of said throttle grip.

3. A throttle grip locking device according to claim 1, including:
    a current source;
    a rotary member starting said engine and switching on and off said current source by the rotating operation of said key;
    a member mechanically driven by rotation of said rotary member; and
    said locking member being engaged with said driven member, projected by said operation of switching off, guided by said driven member, and engaged with a groove of said throttle grip.

4. A throttle grip locking device according to claim 3, wherein:
    said driven member is an eccentric engaging member provided on said rotary member;
    said locking member is arranged to be always resiliently pressed by a spring in a downward direction;
    said engaging part is raised by the rotation of said rotary member with the operation of switching off said key;
    said locking member is raised against said spring; and
    a part of said locking member is engaged with a groove (36) provided in a returning rotating position of said throttle grip to prevent rotation of said throttle grip.

5. A throttle grip locking device according to claim 4, wherein:
    said locking member and its driving means are provided in a throttle housing adjacent to said throttle grip; and
    said rotary member starting the engine and switching on and off said current source is attached to said housing.

6. A throttle grip locking device according to claim 1, wherein:
    said locking member is engaged with a groove provided on said throttle grip, and is provided so that, by a solenoid operating said locking member with the operation of switching on said key, said locking member is disengaged from said groove.

7. A throttle grip locking device according to claim 6, wherein:
    said locking member is resiliently pressed by a spring so as to be always engaged with said groove provided on said throttle grip, and is attracted in a disengaging direction by the operation of said solenoid by the operation of switching on said key.

* * * * *